US012257603B1

(12) United States Patent
Currey

(10) Patent No.: US 12,257,603 B1
(45) Date of Patent: Mar. 25, 2025

(54) AGITATING SHAFT WITH SPACER RAIL

(71) Applicant: Albert Ben Currey, Phoenix, AZ (US)

(72) Inventor: Albert Ben Currey, Phoenix, AZ (US)

( * ) Notice: Subject to any disclaimer, the term of this patent is extended or adjusted under 35 U.S.C. 154(b) by 0 days.

(21) Appl. No.: 18/823,195

(22) Filed: Sep. 3, 2024

(51) Int. Cl.
*B07B 1/14* (2006.01)
*B07B 1/15* (2006.01)
*E02F 3/407* (2006.01)

(52) U.S. Cl.
CPC ................ *B07B 1/15* (2013.01); *E02F 3/407* (2013.01)

(58) Field of Classification Search
CPC ... B07B 1/14; B07B 1/15; B07B 1/526; E02F 3/144; E02F 3/404; E02F 3/405; E02F 3/407
See application file for complete search history.

(56) References Cited

U.S. PATENT DOCUMENTS

| | | | | | |
|---|---|---|---|---|---|
| 1,679,593 | A * | 8/1928 | Williamson | B07B 1/15 | 209/672 |
| 4,538,734 | A * | 9/1985 | Gill | B07B 1/15 | 209/672 |
| 5,975,441 | A * | 11/1999 | Burkholder | B07B 1/005 | 241/101.76 |
| 9,027,762 | B2 * | 5/2015 | Davis | B07B 1/16 | 209/672 |
| 9,616,464 | B1 * | 4/2017 | Currey | E02F 7/06 | |
| 9,895,719 | B2 * | 2/2018 | Wess | B07B 1/155 | |
| 10,111,385 | B2 * | 10/2018 | DeMont | A01D 33/02 | |
| 10,888,899 | B2 * | 1/2021 | Tuttle | B07B 1/155 | |
| 11,253,891 | B2 * | 2/2022 | Benjamins | B07B 1/4627 | |
| 12,103,044 | B1 * | 10/2024 | Currey | B07B 1/526 | |
| 2021/0107032 | A1 * | 4/2021 | Benjamins | B07B 1/4627 | |

* cited by examiner

*Primary Examiner* — Joseph C Rodriguez
(74) *Attorney, Agent, or Firm* — Schmeiser, Olsen & Watts LLP

(57) ABSTRACT

An agitating shaft for use with an agitating screen of a mechanical screening bucket is provided. The agitating shaft may include a shaft member and a spacer rail. The spacer rail may include a base having a mounting surface that engages the shaft member, protrusions extending in a direction opposite the mounting surface, and recesses formed between the plurality of protrusions. The agitating shaft may also include first agitating discs, second agitating discs, and circular spacer discs. The first agitating discs and the second agitating discs may be coupled to the shaft member and the spacer rail such that the first agitating discs and the second agitating discs engage the recesses of the spacer rail. The circular spacer discs may be coupled to the shaft member and the spacer rail such that the circular spacer discs engage the protrusions of the spacer rail.

19 Claims, 19 Drawing Sheets

AGITATING SHAFT WITH SPACER RAIL

BACKGROUND OF THE INVENTION

Technical Field

This invention relates generally to agitating shafts of a mechanical screening bucket and more particularly to agitating shafts of a mechanical screening bucket having spacer rails.

State of the Art

Mechanical screening buckets are operated by an excavator or other like vehicle. The mechanical screening buckets include an agitating screen that includes multiple agitating shafts, each agitating shaft comprising a shaft member with agitating discs coupled to the shaft member. There are spacer discs coupled to the shaft member between the agitating discs forming a space through which material is screened when the agitating shafts rotate, thereby screening smaller material that can fit through the spaces while retaining the larger material within the bucket portion of the mechanical screening bucket. The forming of the agitating shafts is time consuming and can be difficult, particularly when considering the tolerances that the shaft member, the agitating discs and the spacer discs require for manufacturing. This often leads to errors in the assembly of the agitating shafts that affect the operation of the mechanical screening buckets and failure of the agitating shafts.

Accordingly, there is a need for an agitating shaft with a spacer rail for use with mechanical screening buckets that overcome the deficiencies of existing agitating shafts.

SUMMARY OF THE INVENTION

An embodiment includes an agitating shaft for use with an agitating screen of a mechanical screening bucket, the agitating shaft comprising: a shaft member; a spacer rail comprising: a base comprising a mounting surface configured to engage the shaft member; a plurality of protrusions extending in a direction opposite the mounting surface; and a plurality of recesses formed between the plurality of protrusions; a plurality of first agitating discs; a plurality of second agitating discs; and a plurality of circular spacer discs, wherein: the plurality of first agitating discs and the plurality of second agitating discs are coupled to the shaft member and the spacer rail such that the plurality of first agitating discs and the plurality of second agitating discs engage the recesses of the spacer rail; and the plurality of circular spacer discs are coupled to the shaft member and the spacer rail such that the plurality of circular spacer discs engage the plurality of protrusions of the spacer rail, locating each circular spacer disc between each first agitating disc and each second agitating disc.

Another embodiment includes an agitating shaft for use with an agitating screen of a mechanical screening bucket, the agitating shaft comprising: a cylindrical shaft member comprising at least one keyway channel extending a length of the shaft member; a spacer rail comprising: a base that engages the at least one keyway channel of the shaft member; a plurality of protrusions extending in a direction way from the base; and a plurality of recesses formed between the plurality of protrusions; a plurality of first agitating discs; a plurality of second agitating discs; a plurality of third agitating discs; a plurality of fourth agitating discs; and a plurality of circular spacer discs, wherein: the plurality of first agitating discs, the plurality of second agitating discs, the plurality of third agitating discs, and the plurality of fourth agitating discs are coupled to the shaft member and the spacer rail such that the plurality of first agitating discs, the plurality of second agitating discs, the plurality of third agitating discs, and the plurality of fourth agitating discs engage the recesses of the spacer rail; and the plurality of circular spacer discs are coupled to the shaft member and the spacer rail such that the plurality of circular spacer discs engage the plurality of protrusions of the spacer rail, locating each circular spacer disc between each first agitating disc and each second agitating disc.

Another embodiment includes a method of assembling an agitating shaft, the method comprising: coupling a plurality of agitating discs and a plurality of circular spacer discs to a spacer rail, wherein: the plurality of agitating discs comprise an aperture in each agitating disc; the plurality of circular spacer discs comprise an aperture in each agitating disc; the spacer rail comprises: a base comprising configured to engage the shaft member; a plurality of protrusions extending in a direction away from the base; and a plurality of recesses formed between the plurality of protrusions; the plurality of agitating discs are coupled to the spacer rail such that the apertures of the plurality of agitating discs engage the recesses of the spacer rail; and the plurality of circular spacer discs are coupled to the spacer rail such that the apertures of the plurality of circular spacer discs engage the plurality of protrusions of the spacer rail, locating each circular spacer disc between each agitating disc; slide the spacer rail with the plurality of agitating discs and the plurality of circular spacer discs onto a shaft member, wherein the shaft member extends through the apertures of the plurality of agitating discs and the apertures of the plurality of circular spacer discs; and retain the spacer rail, the plurality of agitating discs and the plurality of spacer discs on the shaft member.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Figure 1A:
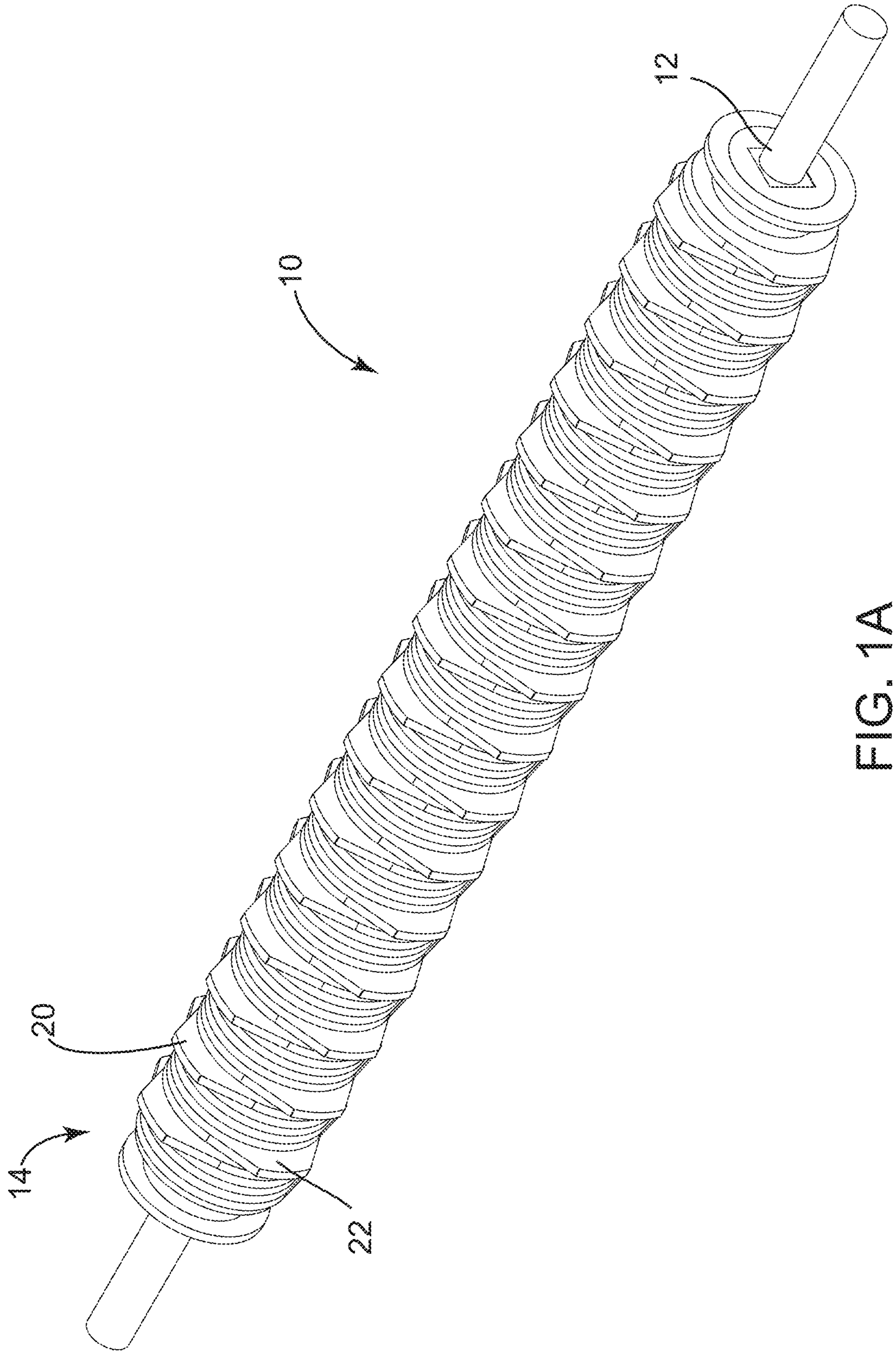
FIG. 1A is a perspective view of an agitating shaft with a spacer rail according to an embodiment.

As discussed above, embodiments of the present invention relate to a rake assembly for use with a mechanical screening bucket, wherein the rake assembly operates to scrape away material and debris that has collected on the agitating screen, particularly within the screening spaces of agitating shafts of the agitating screen.

Referring to the drawings, FIGS. 1A-7 depict an embodiment of an agitating shaft 10 comprising a spacer rail for use with an agitating screen of a mechanical screening bucket. The agitating shaft 10 comprises a shaft member 12 that is a rectilinear shaft member 12. The agitating shaft 10 may further comprise first agitating discs 20, second agitating discs 22, circular spacer discs 24 and a spacer rail 30. End retaining members 14 may be coupled on either end of the shaft member 12 to retain the first agitating discs 20, the second agitating discs 22 and the circular spacer discs 24 on the shaft member 12 to form the agitating shaft 10.

The spacer rail 30 may comprise a base 31 having a mounting surface 36 that engages the shaft member 12 with protrusions 34 extending in a direction opposite the mounting surface 36, the protrusions 34 being spaced apart to form recesses 32 between the protrusions 34. The protrusions 34 may include flat surfaces 35 that are coplanar, and each protrusion 34 may comprise substantially the same length, width and depth dimensions. The recesses 32 may include flat surfaces 33 that are coplanar, and each recess may comprise substantially the same length, width and depth dimensions. Further the plane of flat surfaces 35 of the protrusions 34 and the plane of flat surfaces 33 of the recesses 32 may be parallel.

The first agitating disc 20 may comprise a rectilinear aperture 21 extending through the first agitating disc 20 (see FIG. 5), the rectilinear aperture 21 having a width L1 and a length L2, wherein the length L2 is greater than the width L1. The length L2 is greater than the width L1 to account for the size of the shaft member 12 and the spacer rail 30, wherein the width L1 only accounts for the size of the shaft member 12.

The second agitating disc 22 may comprise a rectilinear aperture 23 extending through the second agitating disc 22 (see FIG. 6), the rectilinear aperture 23 having a width L4 and a length L3, wherein the width L4 is greater than the length L3. The width L4 is greater than the length L3 to account for the size of the shaft member 12 and the spacer rail 30, wherein the length L3 only accounts for the size of the shaft member 12.

The circular spacer disc 24 may comprise a rectilinear aperture 25 extending through the circular spacer disc 24 (see FIG. 7), the rectilinear aperture 25 having a width L5 and a length L6, wherein the length L6 is greater than the width L5. The length L6 is greater than the width L5 to account for the size of the shaft member 12 and the spacer rail 30, wherein the width L5 only accounts for the size of the shaft member 12.

The first agitating discs 20, the second agitating discs 22 and the circular spacer discs 24 may be coupled to the shaft member 12 with the spacer rail 30 engaging a surface of the shaft member 12. The first agitating discs 20 and the second agitating discs 22 may be coupled to the shaft member 12 and the spacer rail 30 such that the first agitating discs 20 and the second agitating discs 22 engage the recesses 32 of the spacer rail 30 (see FIGS. 2A-4). The circular spacer discs 24 may be coupled to the shaft member 12 and the spacer rail 30 such that the circular spacer discs 24 engage the protrusions 34 of the spacer rail 30 (see FIGS. 2A-4). This places a circular spacer disc 24 between each of the agitating discs 20 and 22 to set the screening space defined by the space between each of the agitating discs 20 and 22.

Figure 2A:
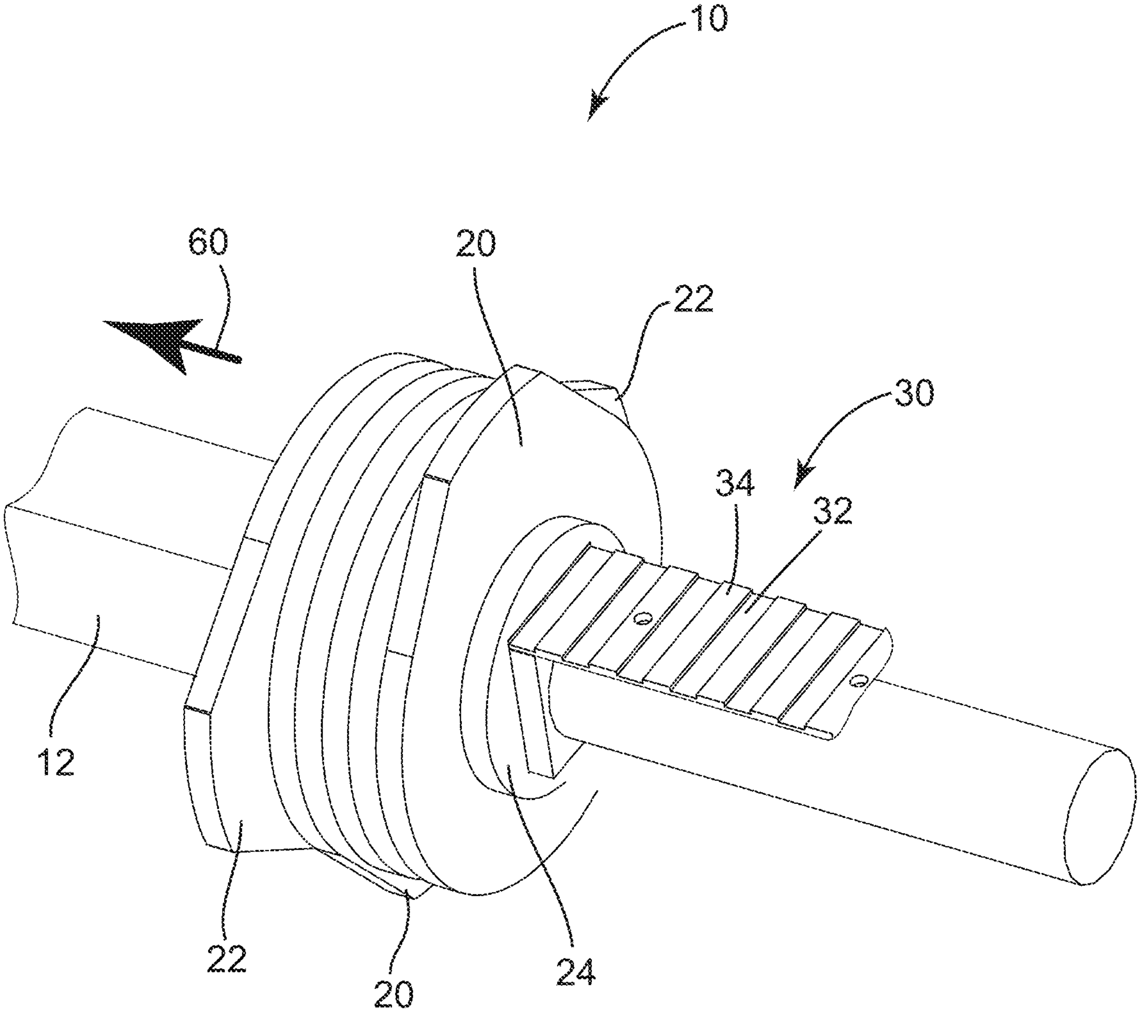
FIG. 2A is a zoomed in perspective view of an agitating shaft with a spacer rail and a portion of agitating discs and spacer discs being coupled to a rectilinear shaft member according to an embodiment.
Figure 2B:
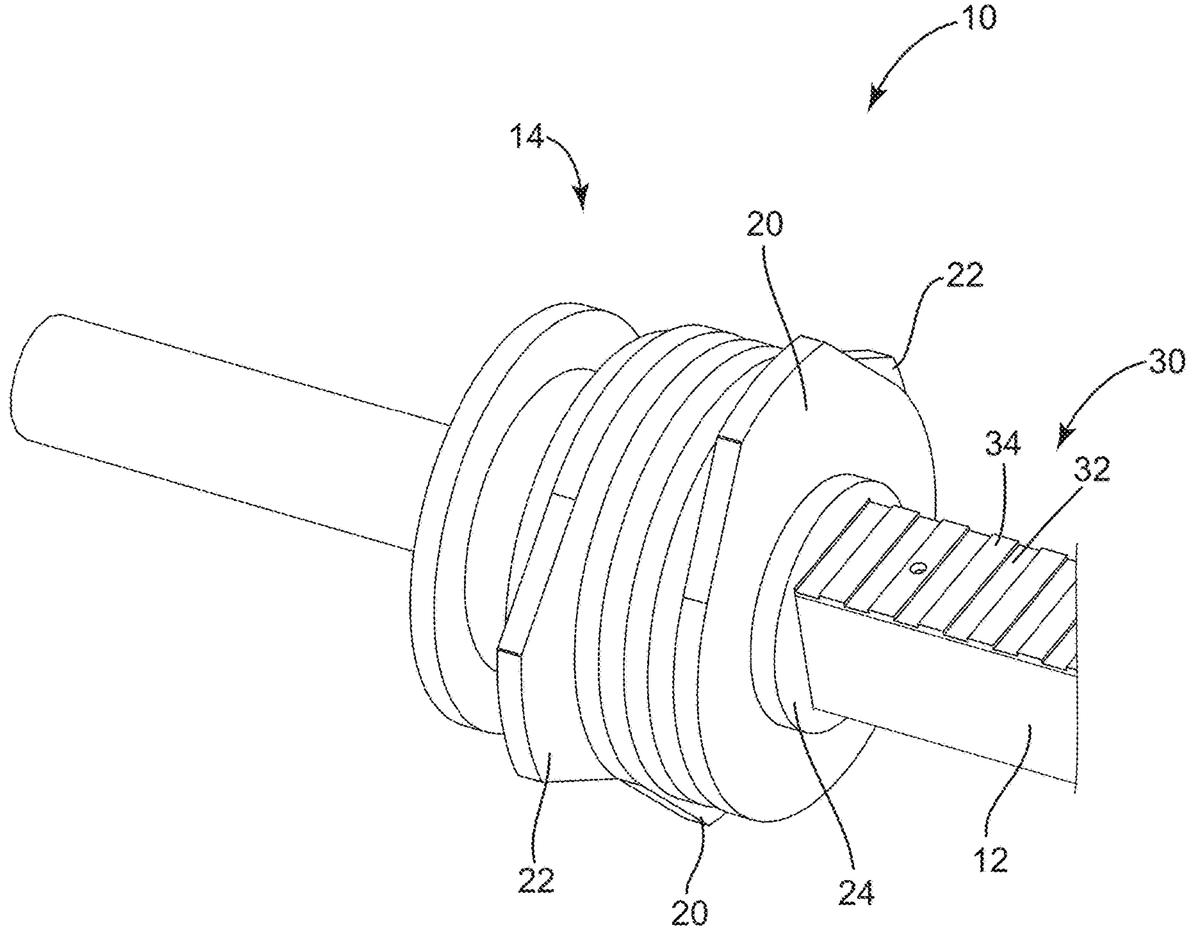
FIG. 2B is a zoomed in perspective view of an agitating shaft with a spacer rail and a portion of agitating discs and spacer discs coupled to a rectilinear shaft member according to an embodiment.
Figure 3:
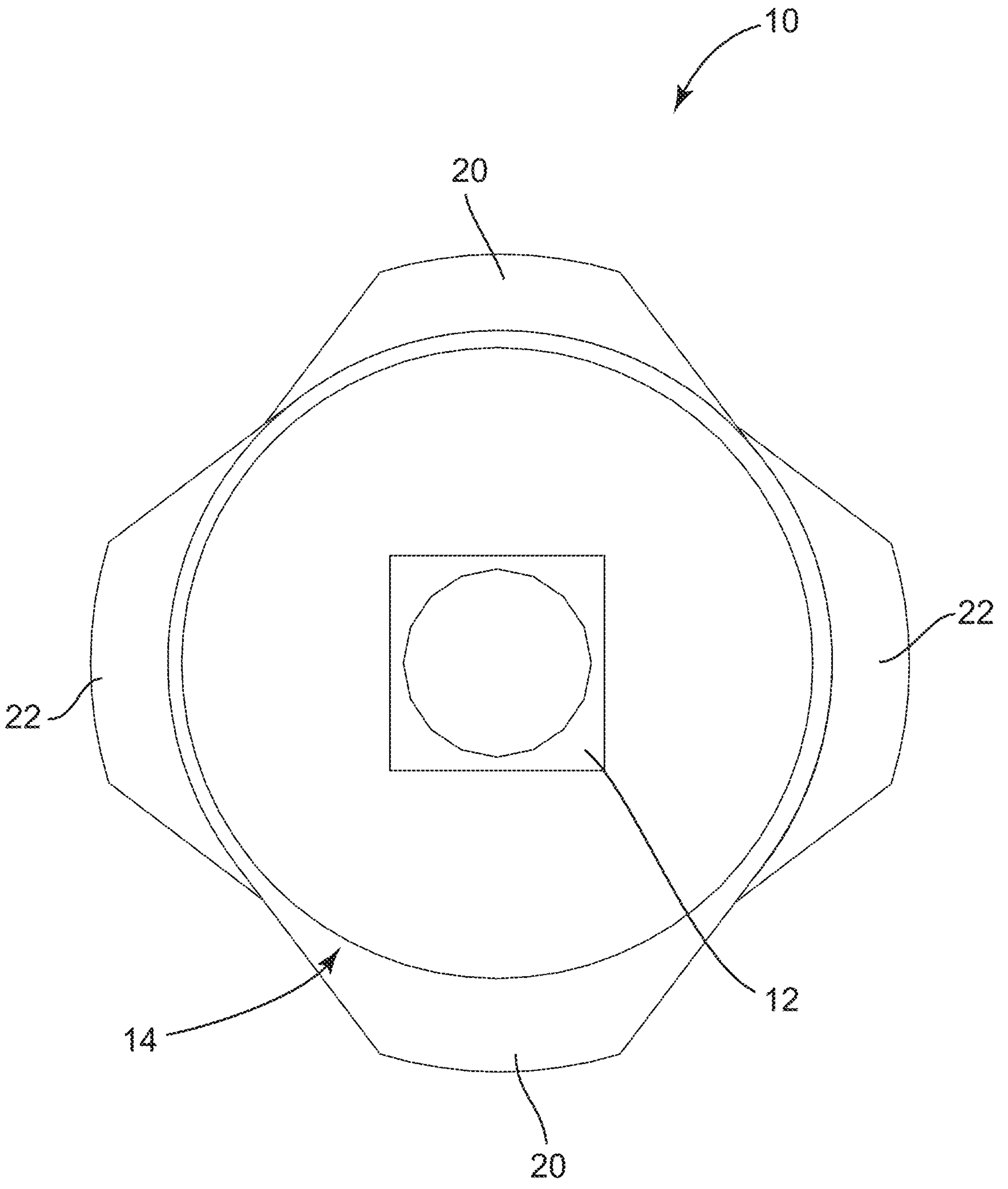
FIG. 3 is an end view of an agitating shaft with a spacer rail according to an embodiment.
Figure 4:
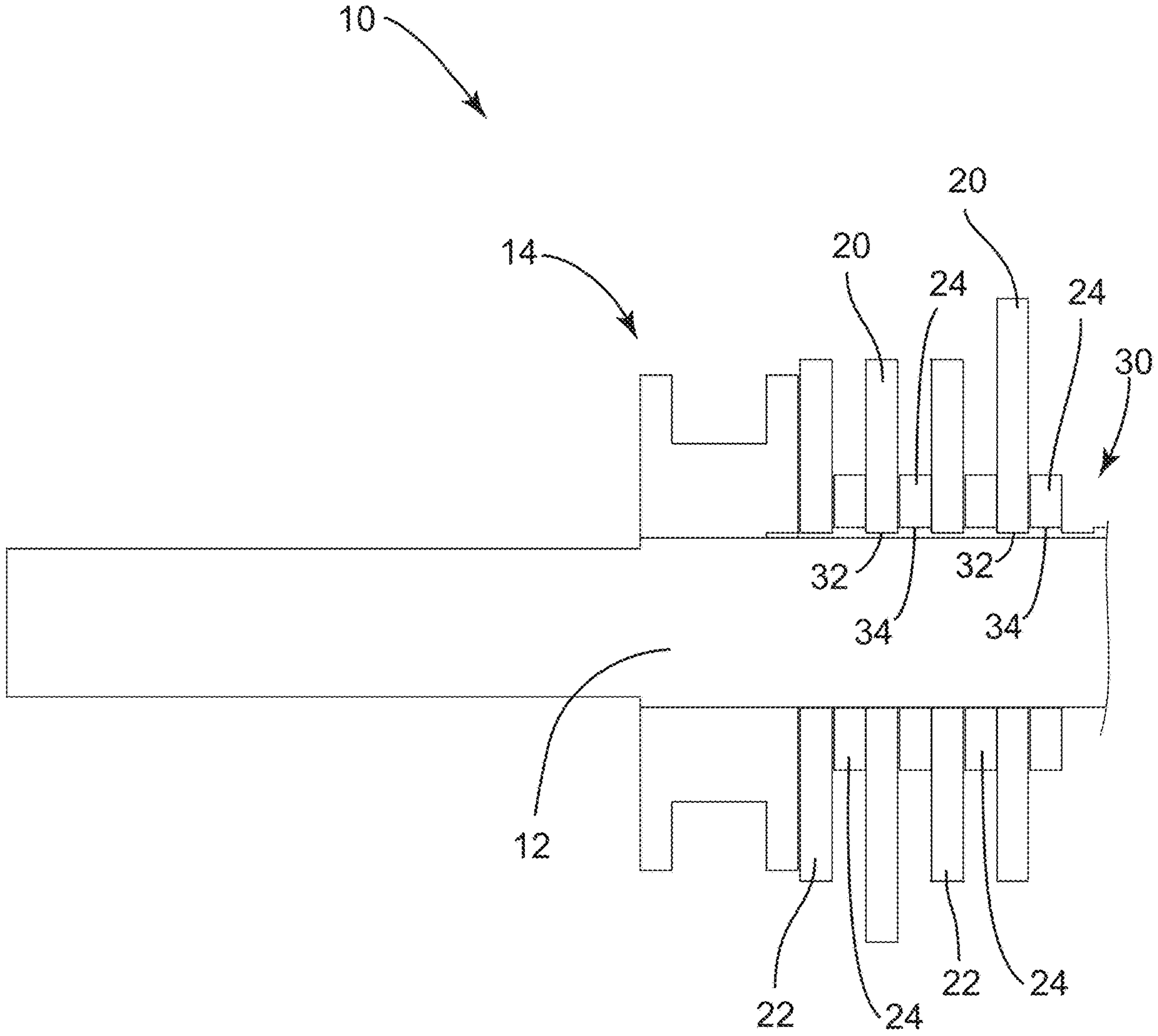
FIG. 4 is a side section view of an agitating shaft with a spacer rail and a portion of agitating discs and spacer discs coupled to a rectilinear shaft member according to an embodiment.
Figure 5:
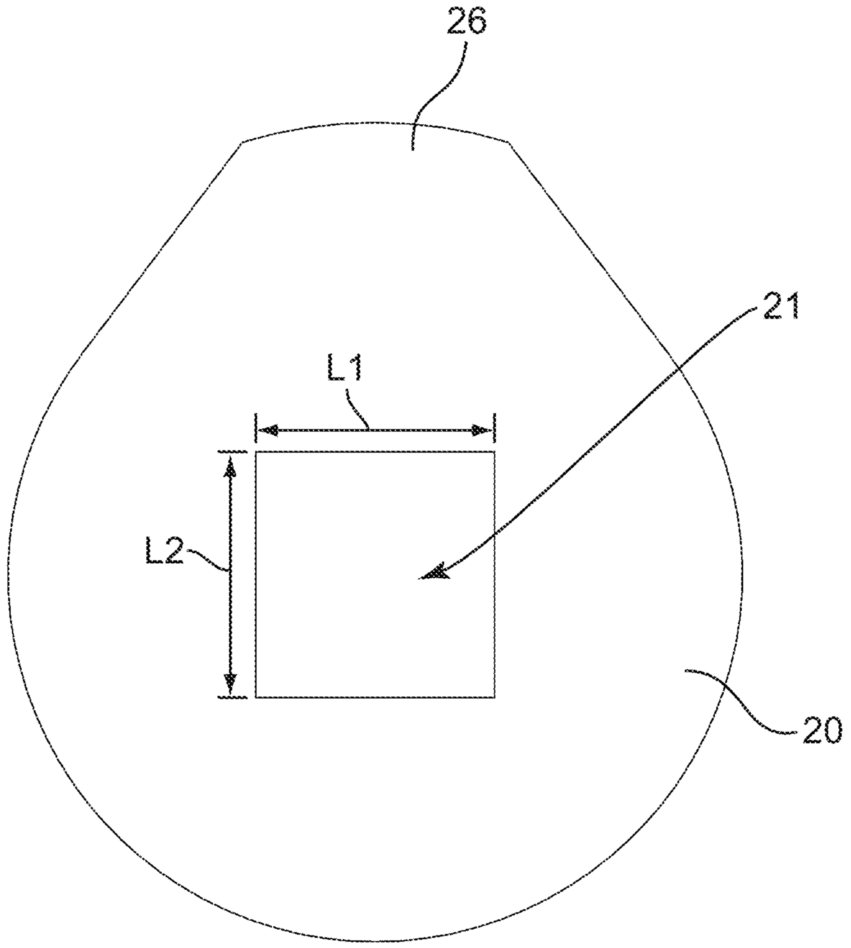
FIG. 5 is an end view of a first agitating disc for use with a rectilinear shaft member according to an embodiment.
Figure 6:
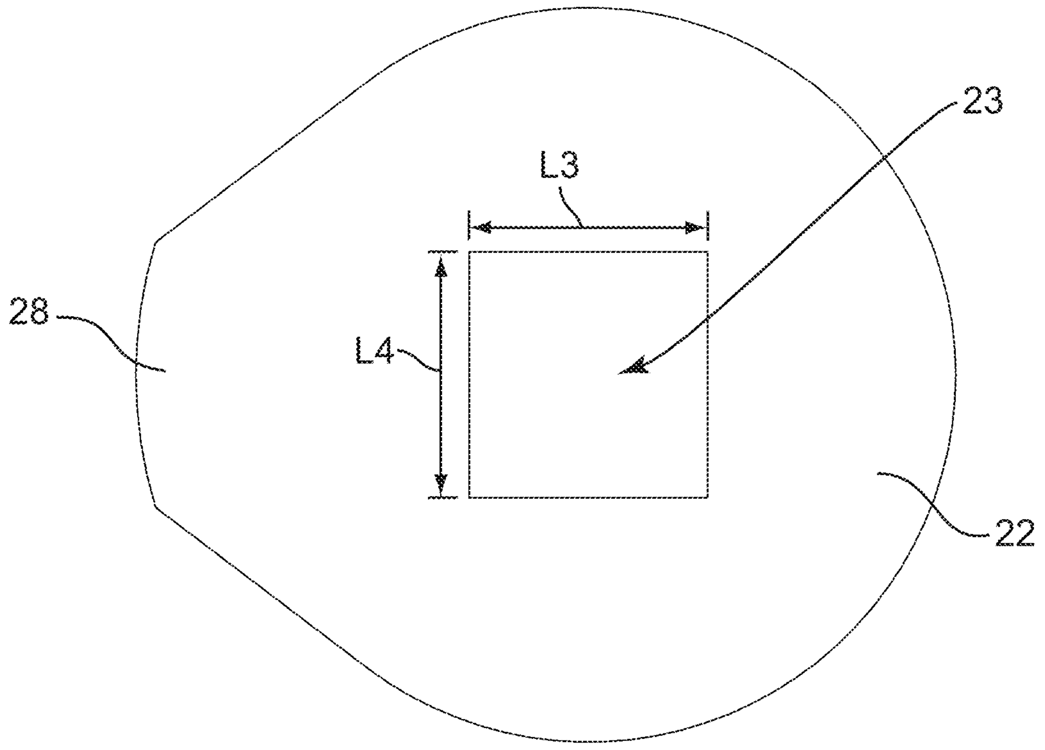
FIG. 6 is an end view of a second agitating disc for use with a rectilinear shaft member according to an embodiment.
Figure 7:
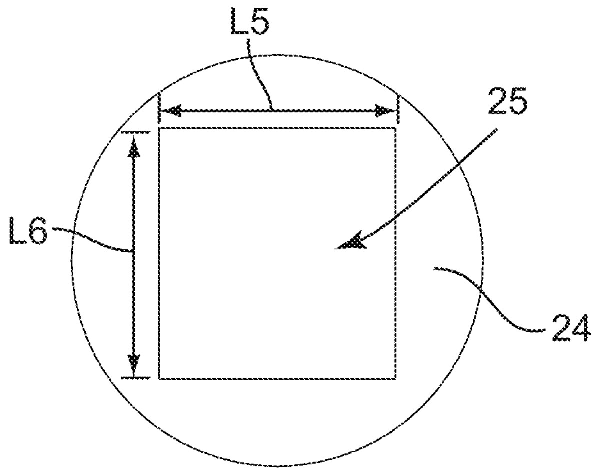
FIG. 7 is an end view of a spacer disc for use with a rectilinear shaft member according to an embodiment.

Referring specifically to FIGS. 2A and 2B, embodiments may include a method of assembling the agitating shaft 10. The method may comprise coupling a plurality of agitating discs 20 and 22 and a plurality of circular spacer discs 24 to a spacer rail 30. The plurality of agitating discs 20 and 22 may be coupled to the spacer rail 30 such that the apertures 21 and 23 of the plurality of agitating discs 20 and 22 engage the recesses 32 of the spacer rail 30. The plurality of circular spacer discs 24 may be coupled to the spacer rail 30 such that the apertures 25 of the plurality of circular spacer discs 24 engage the plurality of protrusions 34 of the spacer rail 30. This locates each circular spacer disc 24 between each agitating disc 20 and 22. The method of assembling may then comprise sliding the spacer rail 30 with the plurality of agitating discs 20 and 22 and the plurality of circular spacer discs 24 onto a shaft member 12, as indicated by arrow 60, wherein the shaft member 12 extends through the apertures 21 and 23 of the plurality of agitating discs 20 and 22 and the apertures 25 of the plurality of circular spacer discs 24 (see FIG. 2A). The method may then include retaining the spacer rail 30, the plurality of agitating discs 20 and 22 and the plurality of spacer discs 24 on the shaft member 30. The may be accomplished by use of retaining members 14 (see FIG. 2B) coupled on both ends of the shaft member 12.

Figure 17:
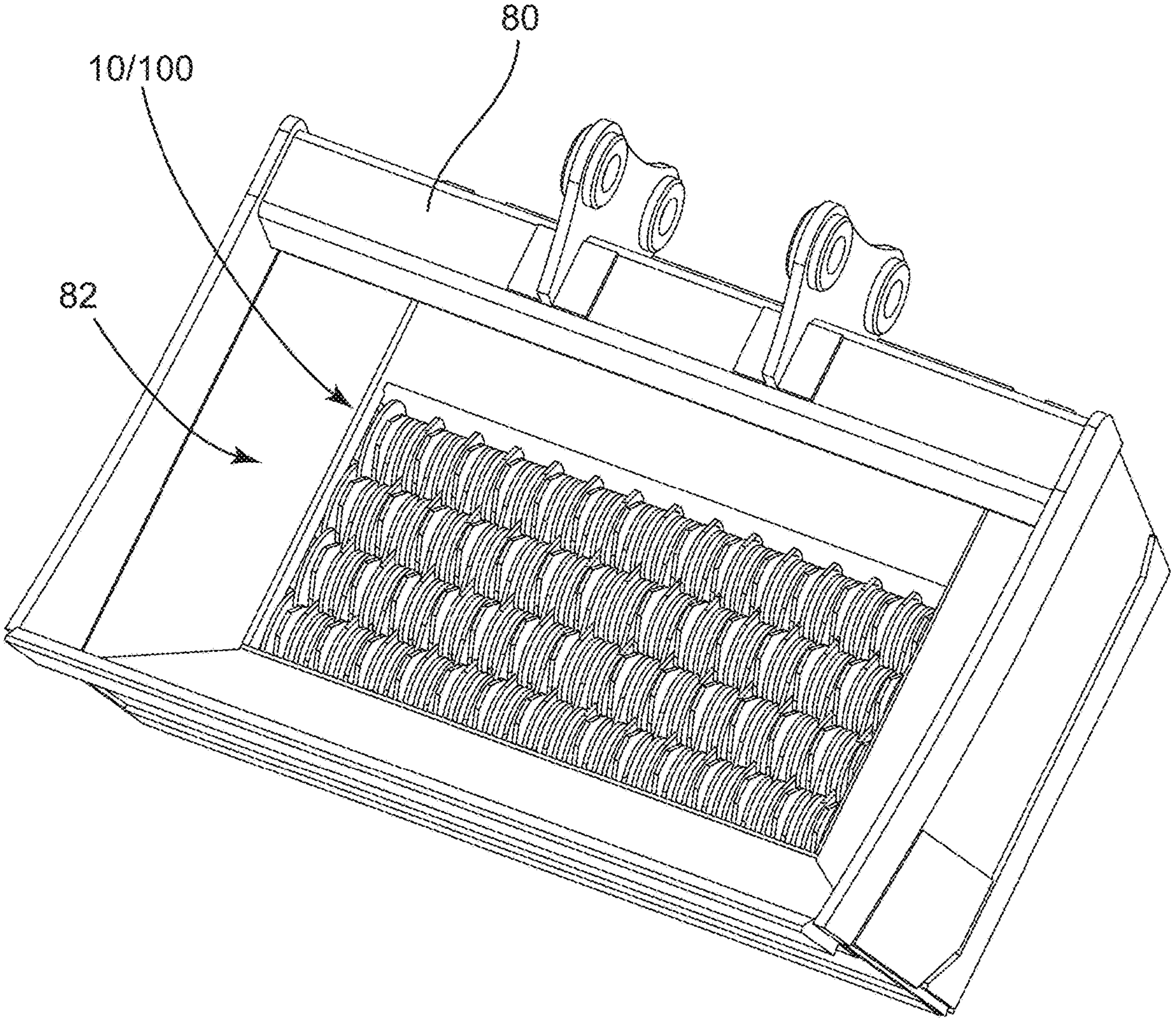
FIG. 17 is a perspective view of a mechanical bucket with the agitating shafts coupled therein according to an embodiment.

Referring to FIGS. 2a-4, the agitating discs 20 and 22 with circular spacer discs 24 may be coupled to the shaft member 12 and clocked or timed to have first lobes 26 of agitating discs 20 and second lobes 28 of agitating discs 22 face in predetermined directions. The dimensions of the apertures in the first agitating discs 20, the second agitating discs 22 and the circular spacer discs 24 are such that allow for proper orientation and timing of the first lobes 26 of the first agitating discs 20 and the second lobes 28 of the second agitating discs 22 are such that when coupled in a mechanical bucket 80 as part of a mechanical screen 82 (see FIG. 17), the first and second agitating discs 20 and 22 and the circular spacer discs 24 operate to maintain the proper screening spaces and avoid interference. Further, the dimensions of the apertures 21 in the first agitating discs 20 and the apertures 23 in the second agitating discs 22 are such that allow for proper orientation and timing of the first lobes 26 of the first agitating discs 20 and the second lobes 28 of the second agitating discs 22, wherein the first lobes 26 may be oriented in two different directions and the second lobes 28 may be oriented in two different directions that are also different from the directions of orientation of the first lobes 26.

Figure 1B:
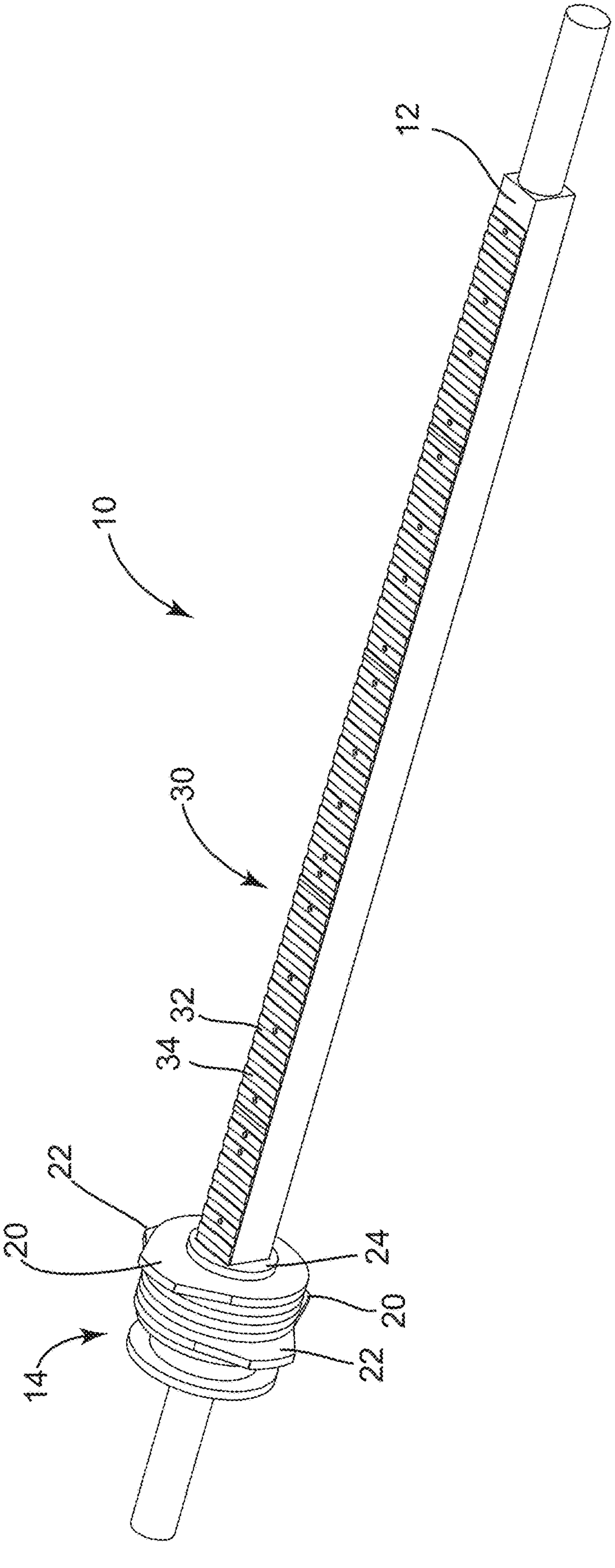
FIG. 1B is a perspective view of an agitating shaft with a spacer rail and a portion of agitating discs and spacer discs coupled to a rectilinear shaft member according to an embodiment.

It will be understood that while it is described that only one spacer rail 30 is used, more than one spacer rail 30 may be used. For example, the spacer rail 30 may be separated into multiple sections as depicted in FIG. 1B or may be a singular spacer rail 30.

Referring to the drawings, FIGS. 8-14 depict an embodiment of an agitating shaft 100 comprising a spacer rail for use with an agitating screen of a mechanical screening bucket. The agitating shaft 100 comprises a shaft member 102 that is a cylindrical shaft member 102 having a keyway channel 106 extending along a length of the cylindrical shaft member 102. The keyway channel 106 may comprise any shape or size. The agitating shaft 100 may further comprise first agitating disc 120*a*, second agitating disc 120*b*, third agitating disc 122*a*, fourth agitating disc 122*b*, circular spacer discs 124 and a spacer rail 130. End retaining members 104 may be coupled on either end of the shaft member 102 to retain the first agitating disc 120*a*, the second agitating disc 120*b*, the third agitating disc 122*a*, the fourth agitating disc 122*b*, the circular spacer discs 124 on the shaft member 102 to form the agitating shaft 100.

The spacer rail 130 may comprise a base 131 that is coupled to the keyway channel 106 of the shaft member 102. The spacer rail 130 may comprise protrusions 134 extending in a direction away from the base 131, the protrusions 134 being spaced apart to form recesses 132 between the protrusions 134.

The first agitating disc 120*a* may comprise a circular aperture 121*a* extending through the first agitating disc 120*a* (see FIG. 12), the circular aperture 121*a* having a first rail channel 140*a*, wherein the first rail channel 140*a* is located toward a first lobe 150*a* of the first agitating disc 120*a*. When coupling the first agitating disc 120*a* to the shaft member 102 and the spacer rail 130, the first rail channel 140*a* engages the spacer rail 130 (see FIGS. 8-10).

The second agitating disc 120*b* may comprise a circular aperture 121*b* extending through the first agitating disc 120*b* (see FIG. 14), the circular aperture 121*b* having a second rail channel 140*b*, wherein the second rail channel 140*b* is located toward a second lobe 150*b* of the second agitating disc 120*b*. When coupling the second agitating disc 120*b* to the shaft member 102 and the spacer rail 130, the second rail channel 140*b* engages the spacer rail 130 (see FIGS. 8-10).

The third agitating disc 122*a* may comprise a circular aperture 123*a* extending through the third agitating disc 122*a* (see FIG. 13), the circular aperture 123*a* having a third rail channel 142*a*, wherein the third rail channel 142*a* is located away from a third lobe 152*a* of the third agitating disc 122*a*. When coupling the third agitating disc 122*a* to the shaft member 102 and the spacer rail 130, the third rail channel 142*a* engages the spacer rail 130 (see FIGS. 8-10).

Figure 15:
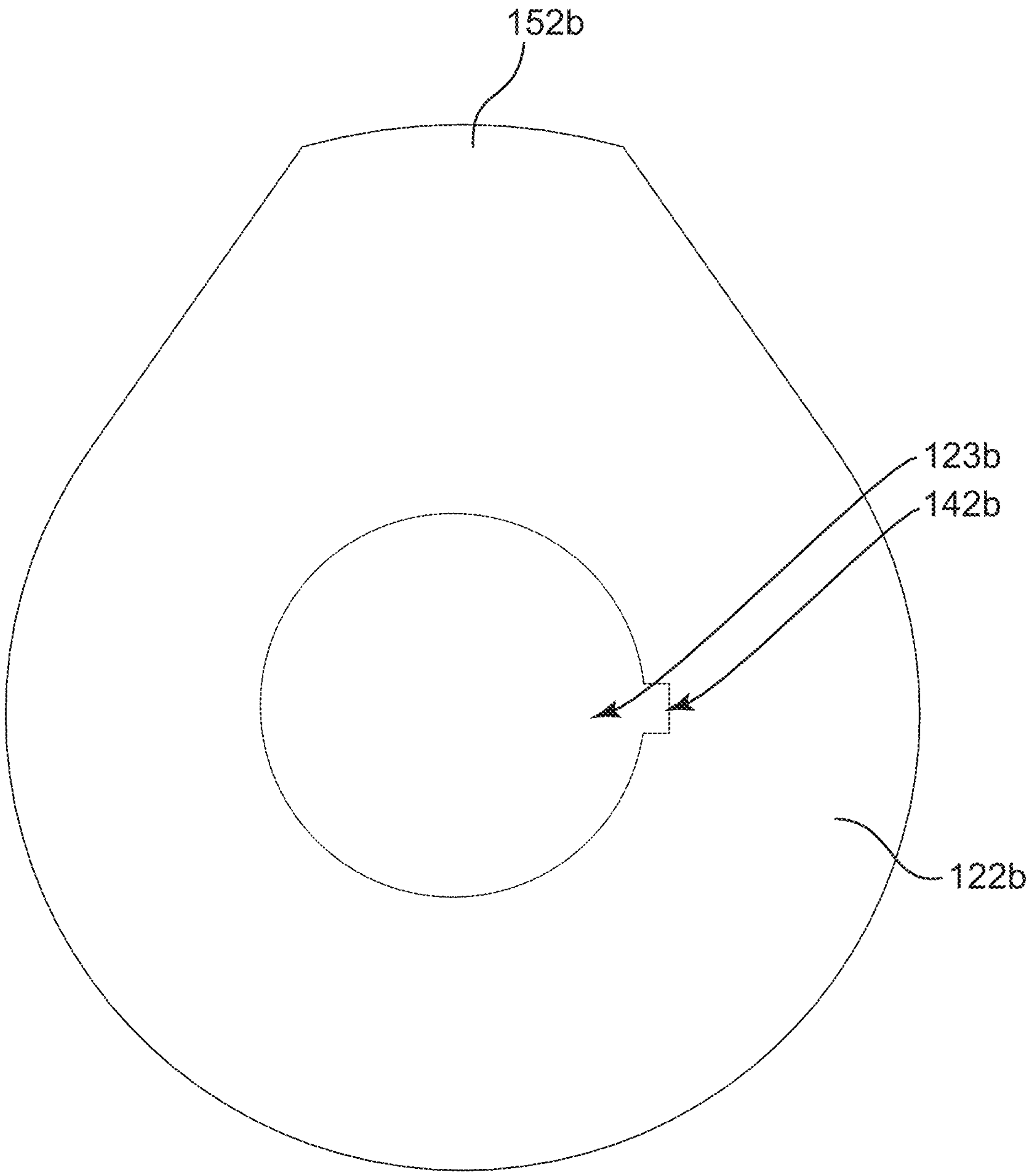
FIG. 15 is an end view of a second agitating disc for use with a cylindrical shaft member according to an embodiment.
Figure 16:
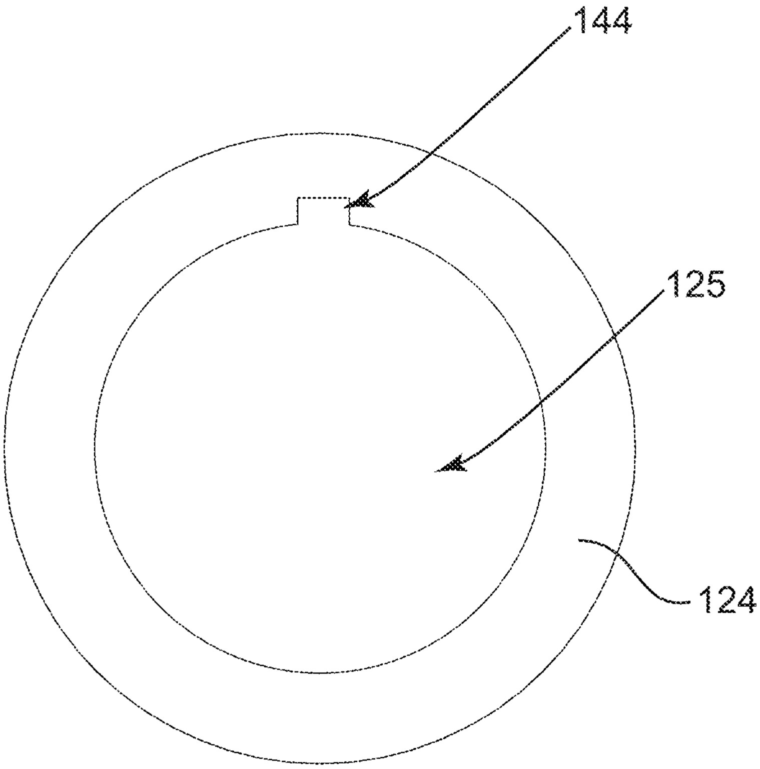
FIG. 16 is an end view of a spacer disc for use with a cylindrical shaft member according to an embodiment.

The fourth agitating disc 122*b* may comprise a circular aperture 123*b* extending through the fourth agitating disc 122*b* (see FIG. 15), the circular aperture 123*b* having a fourth rail channel 142*b*, wherein the fourth rail channel 142*b* is located away from a fourth lobe 152*b* of the fourth agitating disc 122*b*. When coupling the fourth agitating disc 122*b* to the shaft member 102 and the spacer rail 130, the fourth rail channel 142*b* engages the spacer rail 130 (see FIGS. 8-10).

The circular spacer disc 124 may comprise a circular aperture 125 extending through the circular spacer disc 124 (see FIG. 14), the circular aperture 125 having a fifth rail channel 144. When coupling the circular spacer disc 124 to the shaft member 102 and the spacer rail 130, the fifth rail channel 144 engages the spacer rail 130 (see FIGS. 8-10).

The first agitating discs 120, the second agitating discs 122 and the circular spacer discs 124 may be coupled to the shaft member 102 with the spacer rail 130 engaging a surface of the shaft member 102. The first agitating discs 120 and the second agitating discs 122 may be coupled to the shaft member 102 and the spacer rail 30 such that the first agitating discs 120 and the second agitating discs 122 engage the recesses 132 of the spacer rail 130 (see FIGS. 9 and 11). The circular spacer discs 124 may be coupled to the shaft member 102 and the spacer rail 130 such that the circular spacer discs 124 engage the protrusions 134 of the spacer rail 130 (see FIGS. 9 and 11). This places a circular spacer disc 124 between each of the agitating discs 120 and 122 to set the screening space defined by the space between each of the agitating discs 120 and 122.

Figure 8:
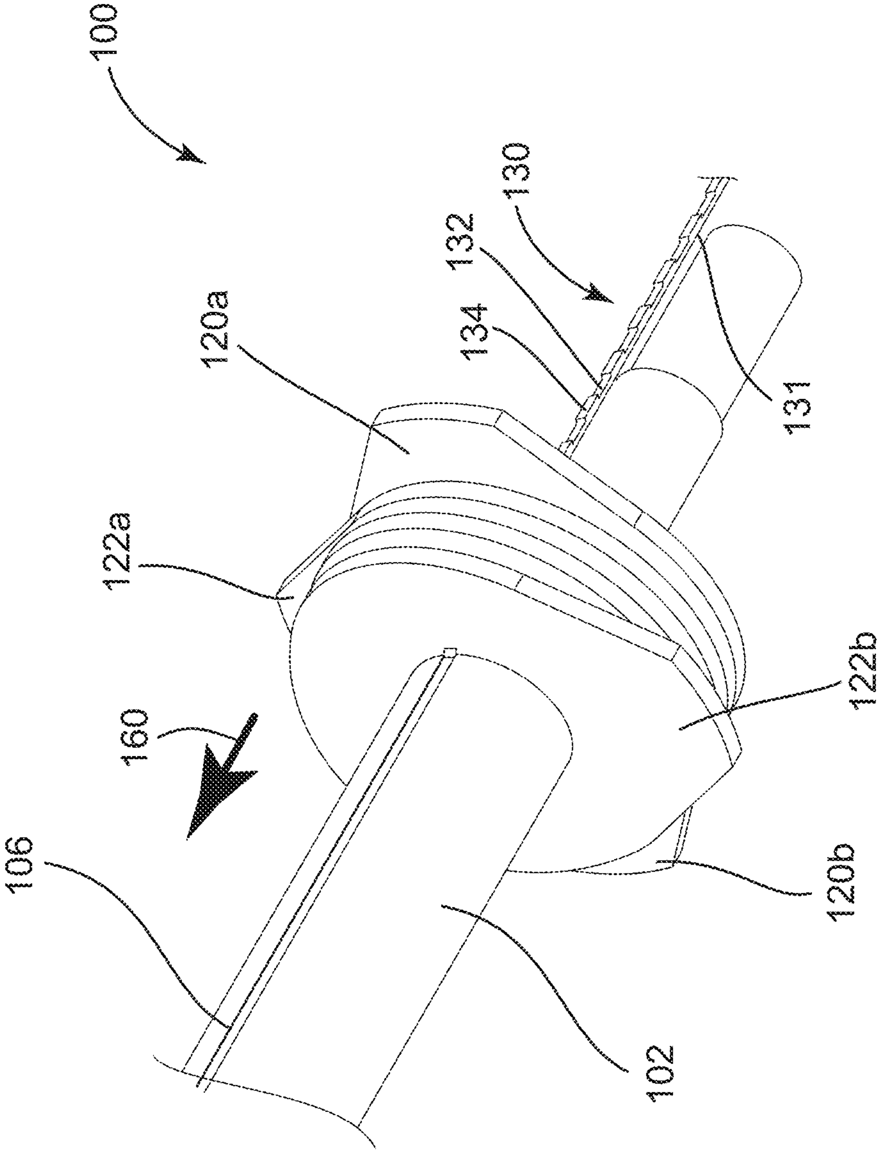
FIG. 8 is a zoomed in perspective view of an agitating shaft with a spacer rail and a portion of agitating discs and spacer discs being coupled to a cylindrical shaft member according to an embodiment.
Figure 9:
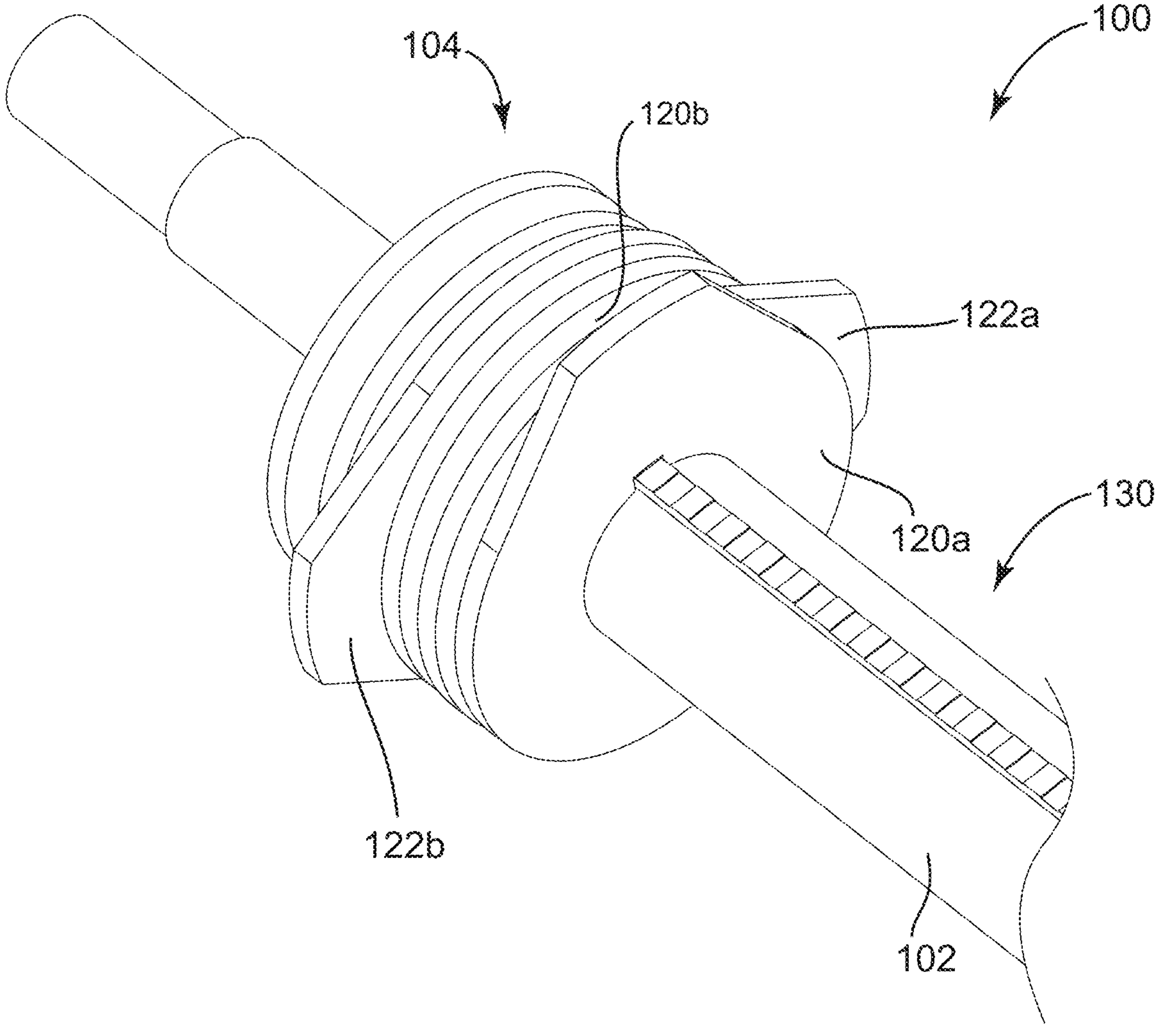
FIG. 9 is a zoomed in perspective view of an agitating shaft with a spacer rail and a portion of agitating discs and spacer discs coupled to a cylindrical shaft member according to an embodiment.
Figure 10:
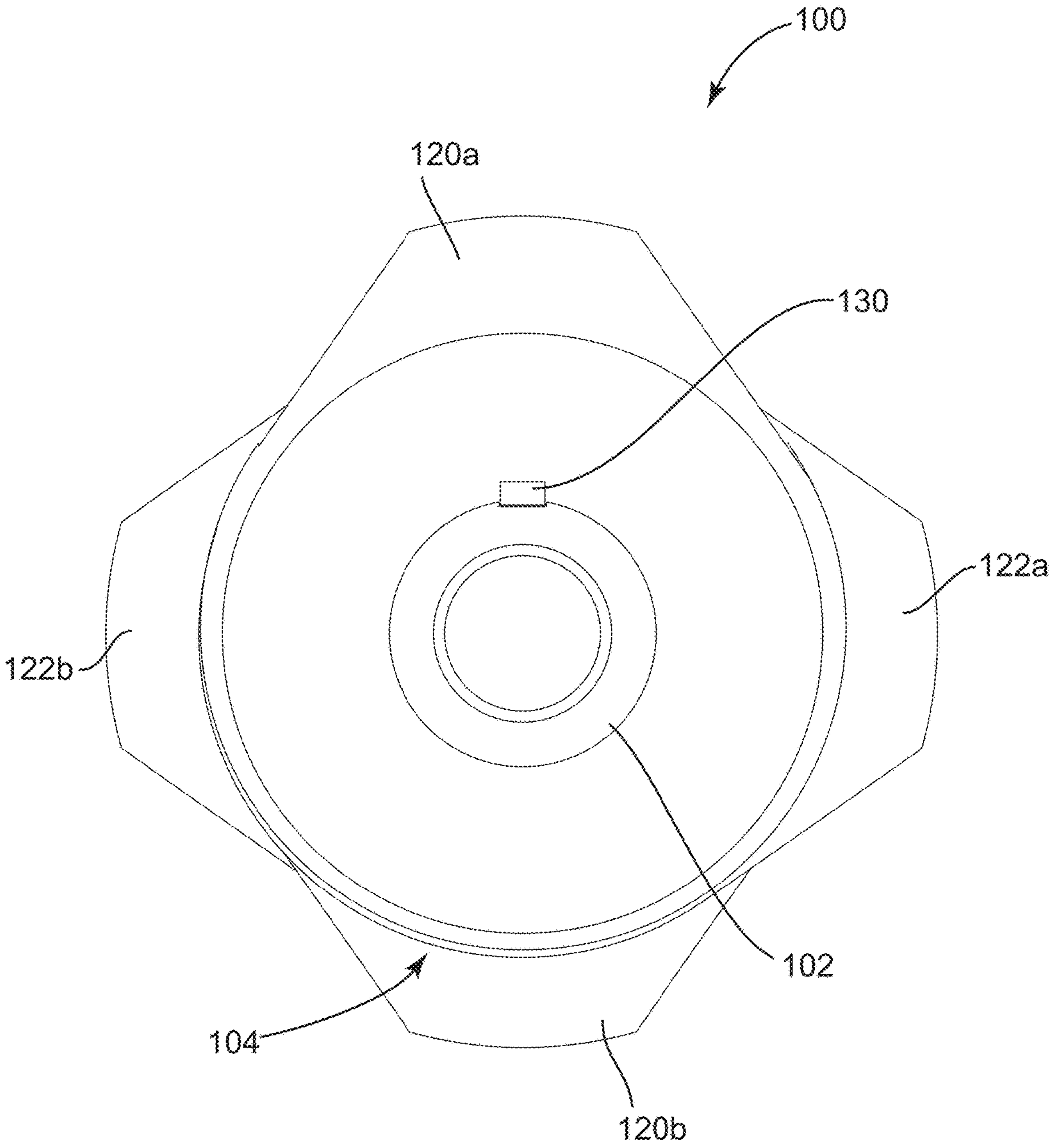
FIG. 10 is an end view of an agitating shaft with a spacer rail according to an embodiment.
Figure 11:
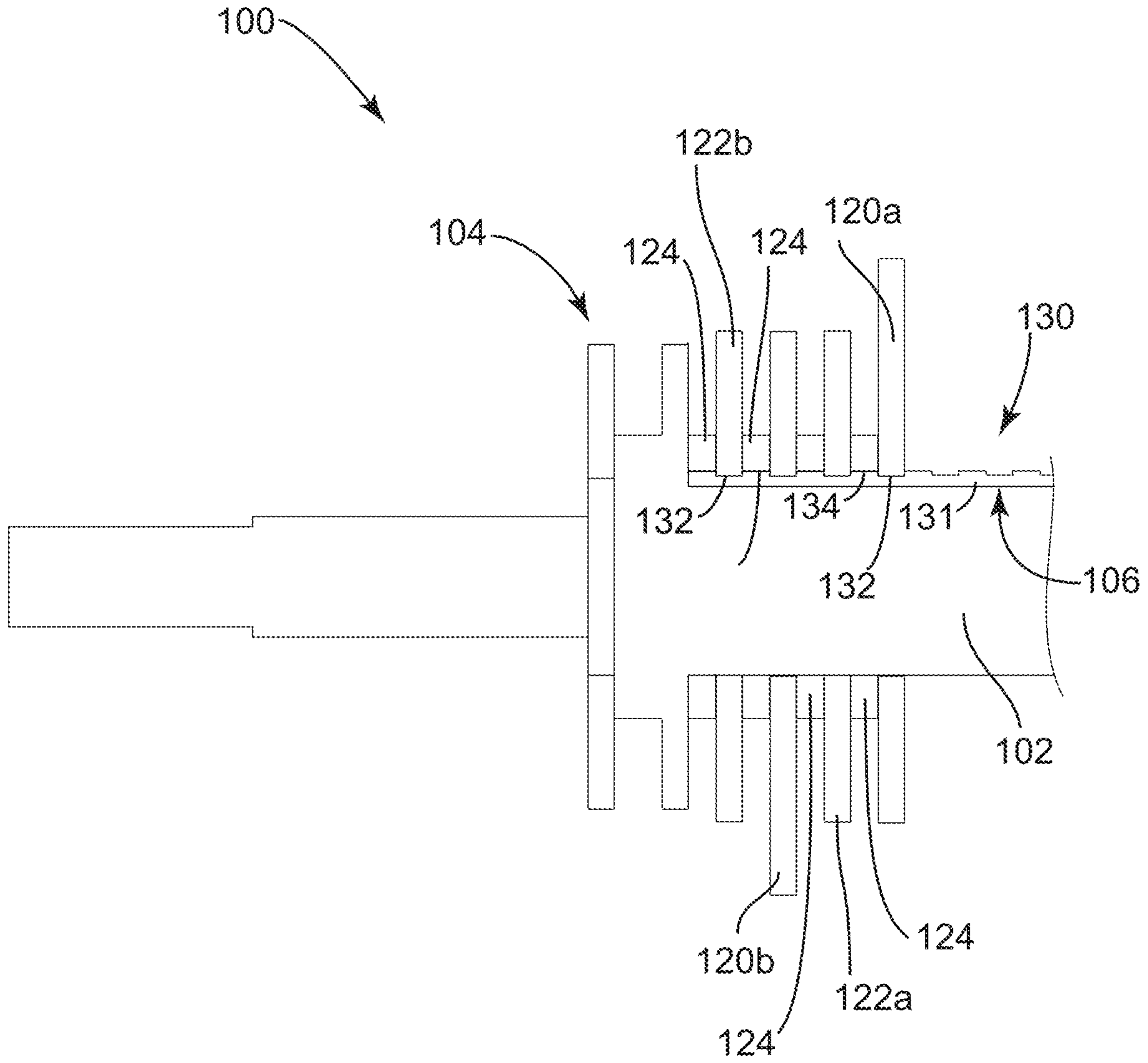
FIG. 11 is a side section view of an agitating shaft with a spacer rail and a portion of agitating discs and spacer discs coupled to a cylindrical shaft member according to an embodiment.
Figure 12:
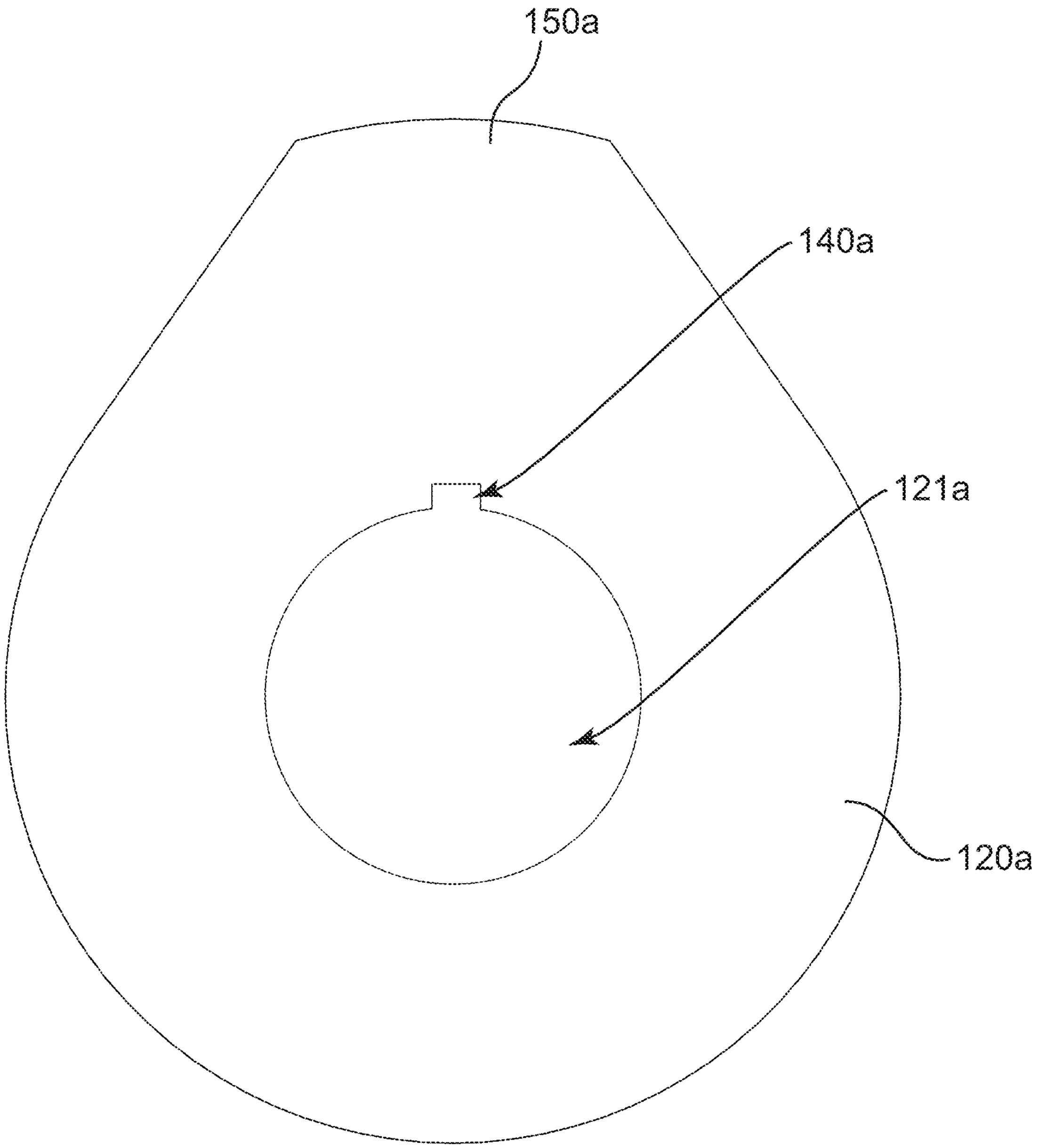
FIG. 12 is an end view of a first agitating disc for use with a cylindrical shaft member according to an embodiment.
Figure 13:
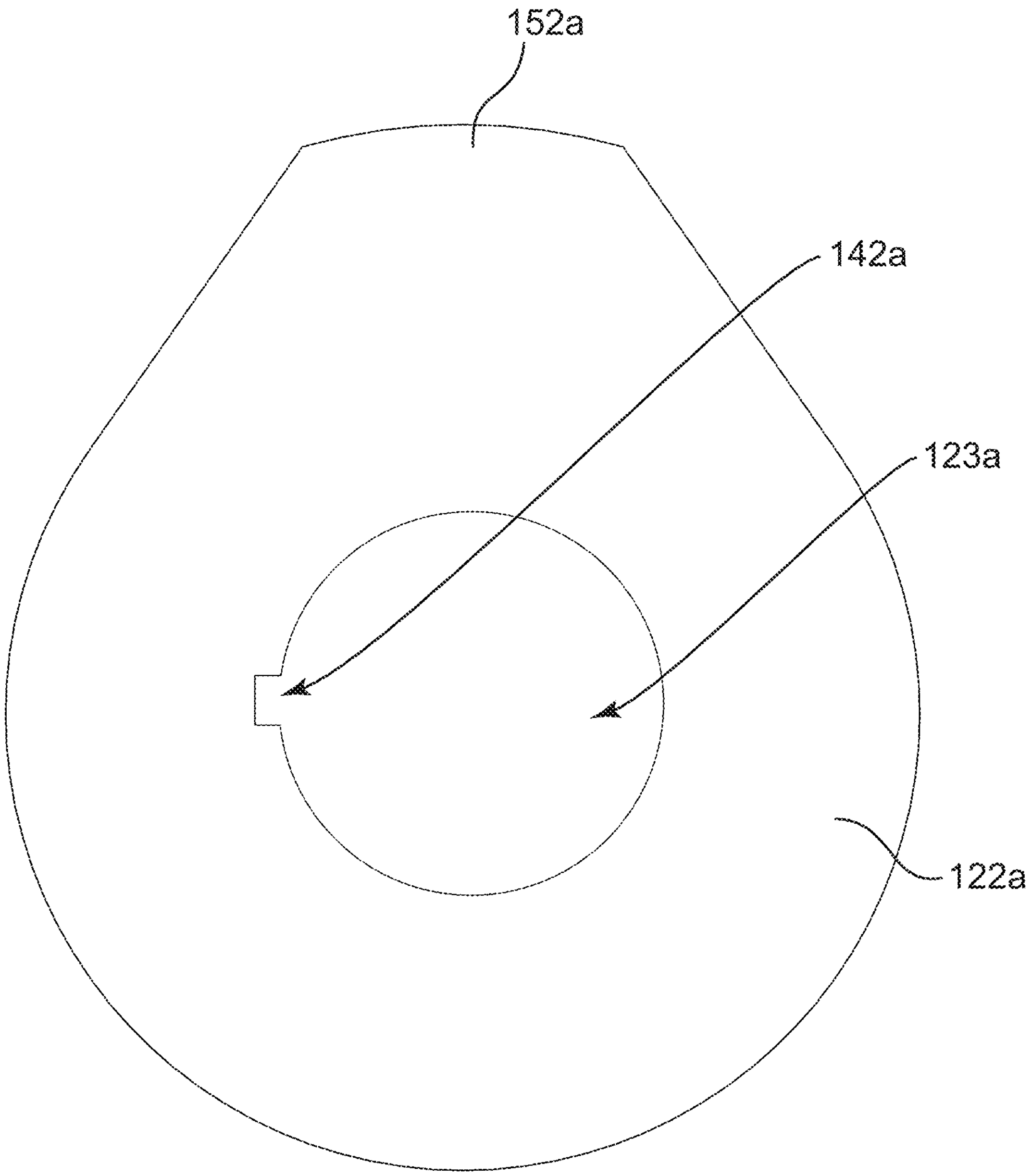
FIG. 13 is an end view of a second agitating disc for use with a cylindrical shaft member according to an embodiment.
Figure 14:
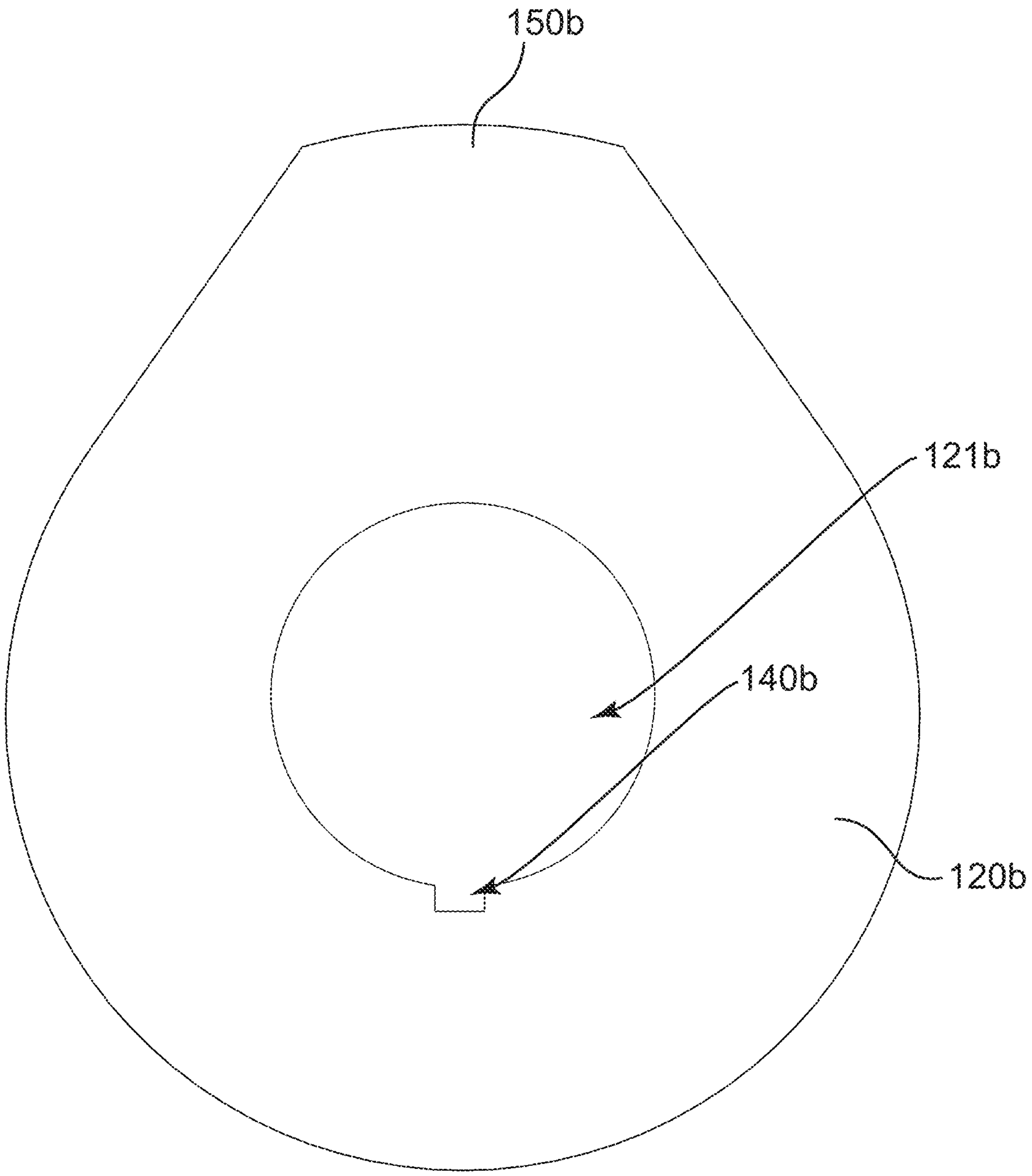
FIG. 14 is an end view of a second agitating disc for use with a cylindrical shaft member according to an embodiment.

Referring specifically to FIGS. 8 and 9, embodiments may include a method of assembling the agitating shaft 100. The method may comprise coupling a plurality of agitating discs 120*a*, 120*b*, 122*a* and 122*b* and a plurality of circular spacer discs 124 to a spacer rail 130. The plurality of agitating discs 120*a*, 120*b*, 122*a* and 122*b* may be coupled to the spacer rail 130 such that the apertures 121*a*, 121*b*, 123*a* and 123*b* of the plurality of agitating discs 120*a*, 120*b*, 122*a* and 122*b* engage the recesses 132 of the spacer rail 130. The plurality of circular spacer discs 124 may be coupled to the spacer rail 130 such that the apertures 125 of the plurality of circular spacer discs 124 engage the plurality of protrusions 134 of the spacer rail 130. This locates each circular spacer disc 124 between each agitating disc 120*a*, 120*b*, 122*a* and 122*b*. The method of assembling may then comprise sliding the spacer rail 130 with the plurality of agitating discs 120*a*, 120*b*, 122*a* and 122*b* and the plurality of circular spacer discs 124 onto a shaft member 102, as indicated by arrow 160, wherein the shaft member 102 extends through the apertures 121*a*, 121*b*, 123*a* and 123*b* of the plurality of agitating discs 120*a*, 120*b*, 122*a* and 122*b* and the apertures 125 of the plurality of circular spacer discs 124 (see FIG. 8). The method may then include retaining the spacer rail 130, the plurality of agitating discs 120*a*, 120*b*, 122*a* and 122*b* and the plurality of spacer discs 124 on the shaft member 130. The may be accomplished by use of retaining members 104 (see FIG. 9) coupled on both ends of the shaft member 102.

Referring to FIGS. 12-16, The agitating discs 120*a*, 120*b*, 122*a* and 122*b* with circular spacer discs 124 may be coupled to the shaft member and clocked or timed to have first lobe 150*a*, second lobe 150*b*, third lobe 152*a*, and fourth lobe 152*b* of the first agitating disc 120*a*, the second agitating disc 120*b*, the third agitating disc 122*a* and the fourth agitating disc 122*b* respectively face in predetermined directions. The location of the first rail channel 140*a* of the aperture 121*a* in the first agitating discs 120*a*, the location of the second rail channel 140*b* of the aperture 121*b* in the second agitating discs 120*b*, the location of the third rail channel 142*a* of the aperture 123*a* in the third agitating discs 122*a*, the location of the fourth rail channel 142*b* of the aperture 123*b* in the fourth agitating discs 122*b*, and the location of the fifth rail channel 144 of the aperture 125 in the circular spacer discs 124 are such that allow for proper timing of the first lobes 150*a* of the first agitating discs 120*a*, the second lobes 150*b* of the second agitating discs 120*b*, the third lobes 152*a* of the third agitating discs 122*a*, and the fourth lobes 152*b* of the fourth agitating discs 122*b* are such that when coupled in a mechanical bucket 80 as part of a mechanical screen 82 (see FIG. 17), the agitating discs 120*a*, 120*b*, 122*a* and 122*b* and the circular spacer discs 124 operate to maintain the proper screening spaces and avoid interference. Further, the location of the first rail channel 140*a* of the aperture 121*a* in the first agitating discs 120*a*, the location of the second rail channel 140*b* of the aperture 121*b* in the second agitating discs 120*b*, the location of the third rail channel 142*a* of the aperture 123*a* in the third agitating discs 122*a*, the location of the fourth rail channel 142*b* of the aperture 123*b* in the fourth agitating discs 122*b* are such that allow for proper orientation and timing of the first lobes 150*a* of the first agitating discs 120*a*, the second lobes 150*b* of the second agitating discs 120*b*, the third lobes 152*a* of the third agitating discs 122*a*, and the fourth lobes 152*b* of the fourth agitating discs 122*b*, wherein the first lobes 150*a*, the second lobes 150*b*, the third lobes 152*a*, and the fourth lobes 152*b* may be oriented in four different directions.

It will be understood that while it is shown in the drawings that only one spacer rail 130 is used, more than one spacer rail 130 may be used. Additionally, the spacer rail 130 may be separated into multiple sections or may be a singular spacer rail 130.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. An agitating shaft for use with an agitating screen of a mechanical screening bucket, the agitating shaft comprising:
- a shaft member;
- a spacer rail comprising:
  - a base comprising a mounting surface configured to engage the shaft member;
  - a plurality of protrusions extending in a direction opposite the mounting surface; and
  - a plurality of recesses formed between the plurality of protrusions;
- a plurality of first agitating discs;
- a plurality of second agitating discs; and
- a plurality of circular spacer discs, wherein:
  - the plurality of first agitating discs and the plurality of second agitating discs are coupled to the shaft member and the spacer rail such that each of the plurality of first agitating discs and each of the plurality of second agitating discs engage only one recess of the plurality of recesses of the spacer rail with each side of each of the plurality of first agitating discs and each of the plurality of the second agitating discs retained between two protrusions extending on each side of the one recess; and
  - the plurality of circular spacer discs are coupled to the shaft member and the spacer rail such that each of the plurality of circular spacer discs engage only one protrusion of the plurality of protrusions of the spacer rail, locating each circular spacer disc between each first agitating disc and each second agitating disc.

2. The agitating shaft of claim 1, wherein the shaft member is a rectilinear shaft member.

3. The agitating shaft of claim 2, wherein the plurality of protrusions of the spacer rail comprises flat surfaces that are coplanar, and each protrusion comprises substantially a same length, width and depth dimensions.

4. The agitating shaft of claim 3, wherein the plurality of recesses comprises flat surfaces that are coplanar, and each recess comprises substantially a same length, width and depth dimensions.

5. The agitating shaft of claim 4, wherein the plane of the flat surfaces of the plurality of protrusions and the plane of the flat surfaces of the plurality of recesses are parallel.

6. The agitating shaft of claim 5, wherein the spacer rail comprises a one or more segments.

7. The agitating shaft of claim 2, wherein each first agitating disc comprises a rectilinear aperture, each second agitating disc comprises a rectilinear aperture, and each circular spacer disc comprises a rectilinear aperture.

8. The agitating shaft of claim 7, wherein the dimensions of the rectilinear apertures of the plurality of first agitating discs, the plurality of second agitating discs and the plurality of circular spacer discs are such that the plurality of first agitating discs, the plurality of second agitating discs and the plurality of circular spacer discs are coupled to the rectilinear shaft member with the spacer rail engaging a surface of the rectilinear shaft member.

9. The agitating shaft of claim 8, wherein dimensions of the rectilinear apertures in the plurality of first agitating discs and the plurality of second agitating discs are such to provide proper orientation and timing of first lobes of the plurality of first agitating discs and second lobes of the plurality of second agitating discs.

10. The agitating shaft of claim 9, wherein the first lobes are configured to be oriented in two different directions and the second lobes are configured to be oriented in two different directions that are also different from the directions of orientation of the first lobes.

11. An agitating shaft for use with an agitating screen of a mechanical screening bucket, the agitating shaft comprising:
- a cylindrical shaft member comprising at least one keyway channel extending a length of the shaft member;
- a spacer rail comprising:
  - a base that engages the at least one keyway channel of the shaft member;

a plurality of protrusions extending in a direction way from the base; and a plurality of recesses formed between the plurality of protrusions;

a plurality of first agitating discs;

a plurality of second agitating discs;

a plurality of third agitating discs;

a plurality of fourth agitating discs; and a plurality of circular spacer discs, wherein:

the plurality of first agitating discs, the plurality of second agitating discs, the plurality of third agitating discs, and the plurality of fourth agitating discs are coupled to the shaft member and the spacer rail such that each of the plurality of first agitating discs, each of the plurality of second agitating discs, each of the plurality of third agitating discs, and each of the plurality of fourth agitating discs engage only one recess of the plurality of recesses of the spacer rail with each side of each of the plurality of first agitating discs, each of the plurality of second agitating discs, each of the plurality of third agitating discs, and each of the plurality of fourth agitating discs retained between two protrusions extending on each side of the one recess; and the plurality of circular spacer discs are coupled to the shaft member and the spacer rail such that each of the plurality of circular spacer discs engage only one protrusion of the plurality of protrusions of the spacer rail, locating each circular spacer disc between each first agitating disc and each second agitating disc.

12. The agitating shaft of claim 11, wherein each first agitating disc comprises an aperture comprising a first rail channel, each second agitating disc comprises an aperture comprising a second rail channel, each third agitating disc comprises an aperture comprising a third rail channel, each fourth agitating disc comprises an aperture comprising a fourth rail channel, and each circular spacer disc comprises an aperture comprising a fifth rail channel.

13. The agitating shaft of claim 12, wherein the first rail channels of the plurality of first agitating discs, the second rail channels of the plurality of second agitating discs, the third rail channels of the plurality of third agitating discs, the fourth rail channels of the plurality of fourth agitating discs, and the fifth rail channels of the plurality of circular spacer discs are such that the plurality of first agitating discs, the plurality of second agitating discs, the plurality of third agitating discs, the plurality of fourth agitating discs, and the plurality of circular spacer discs are coupled to the cylindrical shaft member with the spacer rail engaging keyway channel of the cylindrical shaft member.

14. The agitating shaft of claim 13, wherein a location of the first rail channels in the plurality of first agitating discs, a location of the second rail channels of the plurality of second agitating discs, a location of the third rail channels in the plurality of third agitating discs, and a location of the fourth rail channels of the plurality of fourth agitating discs are such to provide proper orientation and timing of first lobes of the plurality of first agitating discs, second lobes of the plurality of second agitating discs, third lobes of the plurality of third agitating discs, and fourth lobes of the plurality of fourth agitating discs.

15. The agitating shaft of claim 14, wherein the first lobes, second lobes, third lobes and fourth lobes are configured to be oriented in different directions.

16. The agitating shaft of claim 11, wherein the spacer rail comprises one or more segments.

17. A method of assembling an agitating shaft, the method comprising:

coupling a plurality of agitating discs and a plurality of circular spacer discs to a spacer rail, wherein:

the plurality of agitating discs comprise an aperture in each agitating disc;

the plurality of circular spacer discs comprise an aperture in each agitating disc;

the spacer rail comprises:

a base comprising configured to engage the shaft member;

a plurality of protrusions extending in a direction away from the base; and a plurality of recesses formed between the plurality of protrusions;

the plurality of agitating discs are coupled to the spacer rail such that the apertures of each of the plurality of agitating discs engage only one recess of the plurality of recesses of the spacer rail with each side of each of the plurality of agitating discs retained between two protrusions extending on each side of the one recess; and the plurality of circular spacer discs are coupled to the spacer rail such that the apertures of the plurality of circular spacer discs engage the plurality of protrusions of the spacer rail, locating each circular spacer disc between each agitating disc;

slide the spacer rail with the plurality of agitating discs and the plurality of circular spacer discs onto a shaft member, wherein the shaft member extends through the apertures of the plurality of agitating discs and the apertures of the plurality of circular spacer discs; and retain the spacer rail, the plurality of agitating discs and the plurality of spacer discs on the shaft member.

18. The method of claim 17, wherein the shaft member is a rectilinear shaft member.

19. The method of claim 17, wherein the shaft member is a cylindrical shaft member.

* * * * *